United States Patent [19]

Inoue

[11] Patent Number: 4,513,192

[45] Date of Patent: Apr. 23, 1985

[54] TW-EDM METHOD AND APPARATUS WITH EXCESS FLUID STRIPPING GAS JET NOZZLE

[75] Inventor: Kiyoshi Inoue, Tokyo, Japan

[73] Assignee: Inoue-Japax Research Incorporated, Yokohama, Japan

[21] Appl. No.: 503,846

[22] Filed: Jun. 13, 1983

[30] Foreign Application Priority Data

Jun. 11, 1982 [JP] Japan ................................ 57-101077

[51] Int. Cl.³ ................................................ B23P 1/08
[52] U.S. Cl. .............................. 219/69 W; 219/69 D; 219/69 M
[58] Field of Search ............... 219/69 W, 69 D, 69 G, 219/69 S, 69 M

[56] References Cited

U.S. PATENT DOCUMENTS

| 2,526,423 | 10/1950 | Rudorff | 219/69 W |
| 3,936,653 | 2/1976 | Bals | 219/69 W |
| 4,317,019 | 2/1982 | Itoh | 219/69 W |

*Primary Examiner*—M. H. Paschall
*Attorney, Agent, or Firm*—Karl F. Ross; Herbert Dubno

[57] ABSTRACT

A TW-EDM method and apparatus wherein a continuous electrode wire is axially transported from a supply side to a takeup side to travel through an electrically conductive workpiece while a relative displacement is effected between the traveling wire and the workpiece such that the wire is advanced in the workpiece along a prescribed cutting path transverse to the traveling axis of the wire as electroerosive material removal proceeds by the action of electrical discharges across a machining gap flooded with a weakly conductive aqueous machining fluid and maintained between the advancing wire and the workpiece, thereby progressively cutting the workpiece along the cutting path and developing a groove of cutting behind the advancing electrode wire. The rate of advance of the electrode wire for a given machining current is increased by stripping a portion of the flooding fluid which is present in the cutting groove in a region immediately behind the advancing electrode wire. The position of the gas nozzle is angularly controlled so as to maintain the gas jet directed at the said region despite changes in the course of the cutting path.

4 Claims, 3 Drawing Figures

TW-EDM METHOD AND APPARATUS WITH EXCESS FLUID STRIPPING GAS JET NOZZLE

FIELD OF THE INVENTION

The present invention relates generally to traveling-wire (TW) electrical discharge machining (EDM) methods and apparatus and, more particularly, to improvements therein.

BACKGROUND OF THE INVENTION

In TW EDM processes, a continuous electrode wire composed of, e.g. brass, and which is commonly as thin as 0.05 to 0.5 mm is axially transported from a supply side to a takeup side continuously to travel through an electrically conductive workpiece while a relative displacement is effected between the traveling wire and the workpiece such that the wire is advanced in the workpiece along a prescribed cutting path transverse to the traveling axis of the wire as material is electroerosively removed from the workpiece by the action of electrical discharges across a machining gap formed between the electrode wire and the workpiece in the presence of a flooding machining fluid, thereby progressively cutting the workpiece along the prescribed cutting path.

The machining fluid is typically distilled water which is deionized through an ion-exchange cartridge to have a specific resistance as high as $10^3$ to $10^5$ ohm-cm so that it can be effectively dielectric sufficient to cause time-spaced electrical discharges therein. An organic substance which is electrically nonconductive may be added to the deionized water of a relatively low specific resistance to improve the cutting rate. Conversely, a resistivity modifier may be added to the deionized water of a relatively high specific resistance. In all cases, it has been found desirable that the machining fluid with an additive should likewise have a specific resistance in the range described.

In the TW-EDM processes described, there is a constant desire to gain a cutting rate or speed as high as possible. It is desirable that the cutting rate as measured in terms of the rate of advance of the electrode wire be a maximum obtainable for a given level of the machining current. Such cutting rates have heretofore been rather limited.

The present inventor has observed that such limitations limited on the cutting rates obtainable in the prior art are ascribable to the fact that the machining current does not always concentrate at a machining gap of real significance, i.e. between the frontal surface of the advancing electrode wire and that portion of the workpiece which is juxtaposed therewith. In practice, it has been found that the machining current tends to leak through the region of the cutting groove which develops behind the advancing electrode wire and this is due to the presence, in that region, of a portion of the machining liquid externally supplied uncontrolledly to a cutting zone. The machining current tends to leak through the machining liquid of a specific resistance in the range described and due to eroded particles entrapped therein, having an increased conductivity in that region.

OBJECTS OF THE INVENTION

The present invention therefore provides a new and improved TW-EDM method of the type described and using a weakly conductive aqueous machining fluid, which method capable of increasing the cutting rate to a value much higher than those attainable for a given level of the machining current.

The present invention also provides an apparatus adapted for carrying out the method described.

SUMMARY OF THE INVENTION

According to the present invention there is provided in a first aspect thereof a method of electrical-discharge-cutting an electrically conductive workpiece of the type in which a continuous electrode wire is axially transported from a supply side to a takeup side continuously to travel through the workpiece while a relative displacement is effected between the traveling wire and the workpiece such that the wire is advanced in the workpiece along a prescribed cutting path transverse to the traveling axis of the wire as material is electroerosively removed from the workpiece by the action of electrical discharges across a machining gap flooded with a weakly conductive aqueous machining fluid and maintained between the advancing wire and the workpiece, thereby progressively cutting the workpiece along the said cutting path and developing a groove of cutting behind the advancing electrode wire, which method comprises increasing the rate of advance of the electrode wire along the said cutting path by stripping off the machining fluid in the said groove of cutting in a region immediately behing the said advancing electrode wire. Advantageously, that portion of the flooded machining fluid is stripped off by directing a high-velocity stream of pressurized gas into the said region.

The invention also provides in a second aspect thereof a traveling-wire electrical-discharge-machining apparatus having a continuous electrode wire, means for axially transporting the electrode wire from a supply side to a takeup side continuously to cause it to travel through an electrically conductive workpiece, means for electrically energizing the traveling electrode wire and the workpiece to electroerosively remove material from the workpiece by the action of electrical discharges across a machining gap flooded with a weakly conductive aqueous machining fluid between the traveling wire and the workpiece and means for effecting a relative displacement between the traveling wire and the workpiece such that the electrode wire is advanced in the workpiece along a prescribed cutting path transverse to the traveling axis of the wire while maintaining the machining gap, thereby progressively developing a groove of cutting behind the advancing electrode wire, which apparatus also includes nozzle means for directing a high-velocity stream of a pressurized gas into a region of the said cutting groove which is immediately behind the advancing electrode wire, thereby stripping (off) and dislodging a portion of the machining fluid which would otherwise be present in that region. Preferably, means is associated with the nozzle means for maintaining the high-velocity gas stream directed in such a region immediately behind the advancing electrode wire despite changes in the direction of advance of the electrode wire along the cutting path.

BRIEF DESCRIPTION OF THE DRAWING

These and other features of the present invention as well as advantages thereof will become more readily apparent from a reading of the following description when taken with reference to the accompanying drawing in which.

SPECIFIC DESCRIPTION

Figure 1:
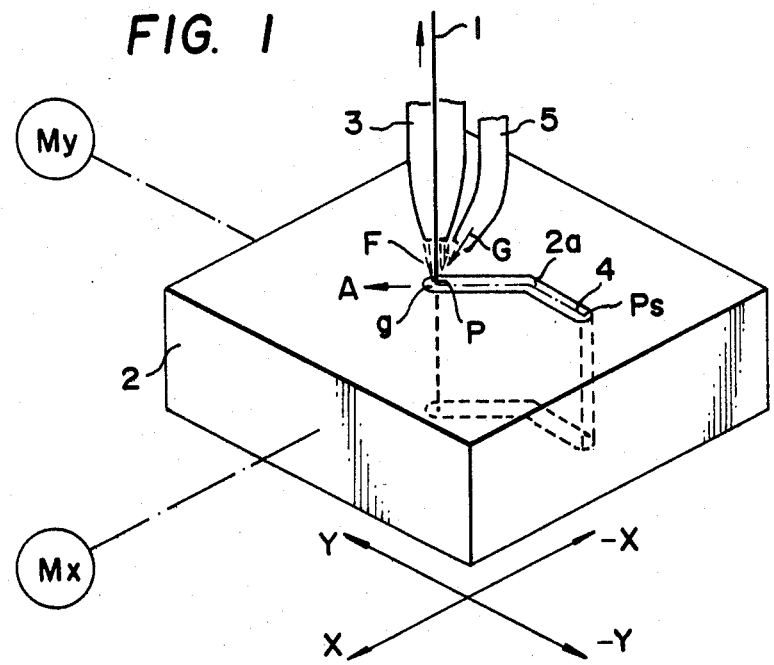
FIG. 1 is a perspective view diagrammatically illustrating a TW-EDM arrangement incorporating a gas-flow nozzle according to the invention.

Referring now to FIG. 1, a TW-EDM arrangement shown makes use of a continuous electrode wire 1 which is continuously transported from a supply side to a takeup side axially to travel, upwards as shown by the arrow, through an electrically conductive workpiece 2 shown in the form of a rectangular block. The electrode wire 1 and the workpiece 2 are electrically energized by an EDM power supply (not shown) to electroerosively remove material from the workpiece 2 by the action of a succession of electrical discharges across a machining gap g formed between the traveling electrode wire 1 and the workpiece 2 and flooded with an aqueous machining fluid F supplied from a nozzle 3 and having a specific resistance ranging between $10^3$ and $10^5$ ohm-cm. To direct the machining fluid F into the regions of the machining gap g, the nozzle 3 is shown as disposed on one side, here the upper side, of the workpiece and as coaxial with the traveling electrode wire 1. Of course, two such nozzles may be disposed on two opposite sides of the workpiece 1 as is common in the art.

The workpiece 2 is supported in a common manner on a worktable (not shown) which is driven by a pair of motors Mx and My. The motors are driven by drive signals furnished from a control system (shown at 12 in FIG. 2), e.g. an NC (numerical control) unit to effect a relative displacement between the traveling electrode wire 1 and the workpiece 2 such that the electrode wire is advanced in the workpiece 2 along a prescribed cutting path 4 defined in a horizontal or X-Y plane transverse to the traveling axis of the electrode wire 1 as the electroerosive material removal continues. The motors Mx and My are driven to displace the workpiece 2 along the X-axis and Y-axis, respectively. As a result, the workpiece 2 is progressively cut along the cutting path leaving a groove 2a of cutting behind the advancing electrode wire 1. The cutting groove 2a extends between the upper and lower surfaces of the workpiece 2. The electrode wire 1 is shown as having advanced from a start position Ps to a position P at a given instant during the course of a prescribed cutting operation.

According to the illustrated embodiment of the invention, a further nozzle 5 is disposed adjacent to the nozzle 3 to direct a jet or pressurized stream of a gas, e.g. air, towards a region of the cutting groove 2a behind the advancing electrode 1 to strip or blow off the aqueous machining fluid F in that region. Such a further nozzle may be or may also be disposed on the lower side of the workpiece 2.

As a result, the electroerosive machining current in the form of a succession of time-spaced electrical discharges is enabled to pass selectively across the machining gap g which is formed between the forward half surface (if the wire 1 is, as typical, circular in section, the forward semi-cylindrical surface) of the traveling electrode wire 1 and the surface of the workpiece which is opposed therewith. Since the machining current is thus prevented from leaking through the groove 2a cut behind the advancing electrode wire, it has been found that a marked increase in the machining current density is obtained, thus resulting in a correspondingly increased rate of cutting or advance of the electrode wire, along the prescribed path 4 in the workpiece 2.

It is common that the cutting path 4 is not a single rectilinear path but includes or comprises one or more corners or arc or angular portions, and it is desirable that the nozzle 5 remain located behind the traveling wire 1 while the latter is advanced relatively in the workpiece 2 along the cutting path 2a so that the nozzle 5 is always oriented towards, and the gas stream G is always directed into, a region of the cutting groove 2a immediately behind the advancing electrode wire 1, irrespective of the direction A of advance of the wire 1 relative to the workpiece 2 in the fixed X-Y plane at each instant during the cutting operation.

Figure 2:
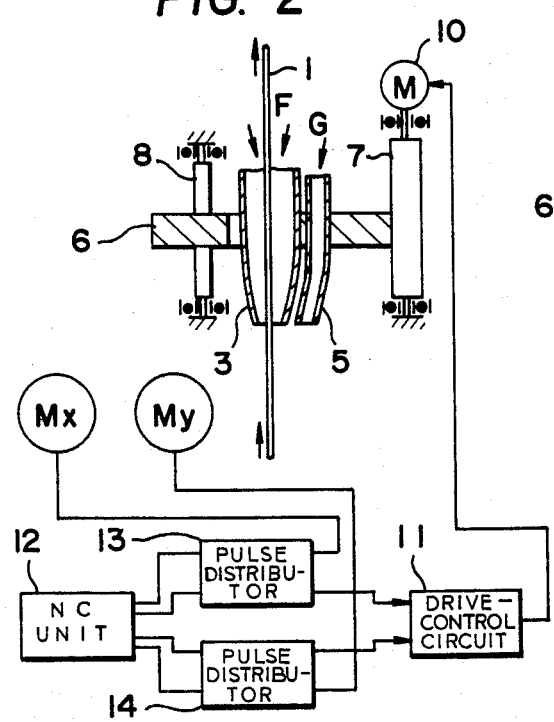
FIGS. 2 and 3 are elevational and plan views, both in section, diagrammatically illustrating a portion of a TW-EDM apparatus which incorporates an embodiment of the invention.
Figure 3:
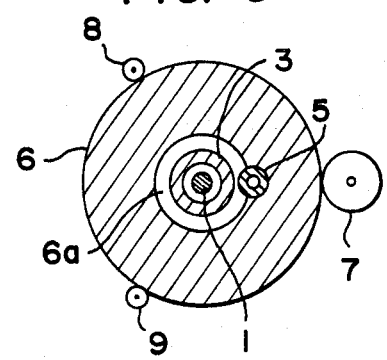

FIGS. 2 and 3 show an arrangement which is capable of maintaining the nozzle 5 located immediately behind the nozzle 3, which is coaxial with the traveling electrode wire, along the cutting path 4 and hence maintaining the gas stream G always directed into a region of the cutting groove immediately behind the electrode wire 1.

In the illustrated arrangement in FIGS. 2 and 3, the nozzle 3 and the nozzle 5 are securely supported by a carriage 6 in the form of a disk having an aperture 6a through which the nozzles 3 and 5 is passed. The disk 6 is circumferentially guided by rollers 7, 8 and 9 and rotatable about its axis, which coincides with the traveling axis of the electrode wire 1. The disk 6 is rotated by one of the rollers, that is the roller 7 which is rotated by the motor 10 in frictional contact with the periphery of the disk 6. The motor 10 is controlledly driven by a drive control circuit 11 which is operatively connected with outputs of the NC unit 12 via pulse distributers 13 and 14. The pulse distributers 13 and 14 are provided to drive the motors Mx and My, respectively, to displace the traveling axis of the wire 1 relative to the workpiece 2 along the prescribed cutting path 4.

The NC unit 12 has a magnetic tape or any other suitable recording medium on which the information preprogrammed for the prescribed cutting path 4 is stored. A suitable reproduction means is provided to read out the information and to regenerate feed signals which are applied to the pulse distributing circuits 13 and 14 designed to distribute clock pulses from a time base into X- and Y-component drive pulses and to apply them to the motors Mx, My, respectively whereby to displace the workpiece 2 so that the traveling axis of the electrode wire 1 precisely moves effectively along the desired cutting path.

The control circuit 11 is adapted to receive control signals from X-axis and Y-axis pulse distributers 13 and 14 of the NC unit 12 which signals are applied to the drive motors Mx and My for the workpiece 2. These signals define the desired path of advance of the workpiece 2 relative to the traveling axis of the electrode wire 1 and hence of desired advance of the electrode wire 1 relative to the workpiece 2. The control circuit 11 derives from these signals an "angular" sensing signal which represents an angle of the tangent to the cutting path at each preset point thereon with respect to a predetermined coordinate axis and, from this "angular" sensing signal, produces an "angular" drive signal to be furnished to of the traveling axis of the wire occurs, in the cutting path 4, an "angular" drive signal is provided to be furnished to the motor 10 to rotate the carriage 6 and hence to alter the angular position of the nozzle 5 thereon about the said traveling axis so that the gas jet G is always directed into a region of the cutting groove 2a which is precisely behind the advancing electrode wire 1. The carriage 6 can be rotated by an angle θ which is given by the equation y/x=tanθ. It should be noted that the pressurized gas stream G also serve to keep the wire 1 straight in the cutting zone against the machining or discharge pressure tending to deflect it backwards.

EXAMPLE

A steel workpiece composed of SKD-11 (Japanese Industrial Standard) material and having a thickness of 20 mm is TW-EDMed with a copper electrode wire of a thickness of 0.2 mm and with deionized water having a specific resistance of $7 \times 10^4$ ohm-cm and supplied from a nozzle, 3 in FIG. 1, into the machining gap g under a pressure of 7.5 kg/cm². According to the conventional method, i.e. without a gas stream G, the cutting proceeds at a rate of 0.5 mm/minute. When a gas stream G is directed and remains directed from a nozzle 5 into a region of the cutting slot or groove 2a which is precisely behind the advancing wire 1 to strip or blow off the machining fluid in that region, the cutting rate is increased to as high as 1.2 mm/minute which is 2.4 times as great as the cutting rate obtainable heretofore.

What is claimed is:

1. In a method of electrical-discharge-cutting an electrically conductive workpiece wherein a continuous electrode wire is axially transported from a supply side to a takeup side continuously to travel through the workpiece while a relative displacement is effected between the traveling wire and the workpiece such that the wire is advanced in the workpiece along a prescribed cutting path in a direction transverse to the axial transport of the wire and to the length dimension thereof as material is electroerosively removed from the workpiece by the a action of electrical discharges across a machining gap flooded within a weakly conductive aqueous machining fluid and maintained between the advancing wire and the workpiece, thereby progressively cutting the workpiece along the said path developing a groove of cutting behind the advancing electrode wire, the improvement which comprises increasing the rate of advance of the electrode wire along said cutting path in said direction by stripping a portion of said flooding machining fluid which is existent in said groove of cutting behind said advancing electrode wire, by directing a stream of a pressurized gas into the said region so that the discharge velocity of said fluid from behind said advancing electrode wire is greater than the passage of said fluid from the gap ahead of said advancing wire in said direction.

2. The improvement defined in claim 1, further comprising maintaining said gas stream directed in the region immediately behind said advancing electrode wire against a change in direction of advance of the electrode wire along said cutting path.

3. In a traveling-wire electrical-discharge-machining apparatus having a continuous electrode wire, means for axially transporting the electrode wire from a supply side to a takeup side continuously to cause it to travel through an electrically conductive workpiece, means for electrically energizing the traveling electrode wire and the workpiece to electroerosively remove material from the workpiece by the action of electrical discharges across a machining gap flooded with a weakly conductive aqueous machining fluid between the traveling wire and the workpiece and means for effecting a relative displacement between the traveling wire and the workpiece such that the electrode wire is advanced in the workpiece along a prescribed path in a direction transverse to the axial transport of the wire and to the length dimension thereof while maintaining the machining gap, thereby progressively cutting the workpiece along the cutting path developing a groove of cutting behind the advancing electrode wire, an improvement which includes nozzle means for directing a high-velocity stream of a pressurized gas into a region of said cutting groove which is immediately behind the advancing electrode wire as it is displaced in said direction relative to said workpiece, thereby stripping a portion of said flooding machine fluid which is existent in said region so that the discharge velocity of said fluid from behind said advancing electrode wire is greater than the passage of said fluid from the gap ahead of said advancing wire in said direction.

4. The improvement defined in claim 3, further comprising means associated with the nozzle means for maintaining said high-velocity gas stream directed in such a region immediately behind the advancing electrode wire continuously in spite of any change in the direction of advance of the electrode wire along said cutting path.

* * * * *